June 17, 1941.　　　I. A. HUNTING　　　2,245,860
LUBRICATING SYSTEM
Filed Oct. 15, 1938　　　6 Sheets-Sheet 1

INVENTOR.
Irving A. Hunting
BY
E. Guyer Murphy
ATTORNEY.

June 17, 1941.   I. A. HUNTING   2,245,860
LUBRICATING SYSTEM
Filed Oct. 15, 1938   6 Sheets-Sheet 2

INVENTOR.
Irving A. Hunting
BY E. Guyer Murphy
ATTORNEY.

INVENTOR.
Irving A. Hunting

Fig. 11

June 17, 1941.    I. A. HUNTING    2,245,860
LUBRICATING SYSTEM
Filed Oct. 15, 1938    6 Sheets-Sheet 6

INVENTOR.
Irving A. Hunting
BY
E. Guyer Murphy
ATTORNEY.

Patented June 17, 1941

2,245,860

UNITED STATES PATENT OFFICE 2,245,860

LUBRICATING SYSTEM

Irving A. Hunting, South Plainfield, N. J.

Application October 15, 1938, Serial No. 235,258

9 Claims. (Cl. 184—27)

This invention in general relates to lubricating systems and more particularly to an automatic lubricating system designed and adapted for the economical and efficient lubrication of various types of machines and moving parts of mechanisms of diverse description.

The object of the invention is to provide a lubricating system involving a method and means wherein lubricant is fed to preselected points of a mechanism, the effective feeding action taking place at predetermined timed intervals in contradistinction to a continuous feeding action.

Another object of the invention is the provision of a method and means for supplying an adequate supply of lubricant to the moving elements of machines under conditions assuring the highest economy of lubricant and power.

A further object of the invention is to provide a lubricating device including a novel timing mechanism and clutching arrangement for the economical dispensing of lubricant to predetermined points of a machine and in predetermined quantities.

According to this invention, oil is supplied to the bearings of machines in such wise that oil may enter the bearings under the action of gravity alone after the delivery of the oil in proper amount for each bearing. The oil is supplied by means of a piston pump in a tank. The pump operates one stroke or cycle, then remains stationary for a predetermined time before making another stroke, with the proviso however, that an operative can cause the pump to make a number of repeated strokes to supply oil when a machine is being started, or whenever desired. The pump itself is operated through the intermediary of a timed clutch the timing of which is accomplished by a novel timing mechanism including a train of gears and a series of cams. In the form illustrated, the first cam turns one-sixth as fast as the driving gear containing the clutch. Each succeeding cam is reduced in like ratio. The drive shaft, which is oiled from a built-in oiler, being above the oil in the tank, eliminates the necessity for a stuffing-box or packed bearing. With the exception of the pumping stroke, comparatively little power is required to operate the device.

Oil under pressure from the pump is applied to the feeders by a pipe line which, after supplying the said feeders, returns the surplus oil to the tank through a spring valve which is set for the general pressure desired in the pipe line during the stroke of the pump. The feeders may be individually set to deliver the desired amount of oil for each stroke, which may be a part of a drop or several drops at a time. The pulsating flow of the oil substantially prevents clogging of the feed line while a filter in the tank eliminates dirt and foreign particles from entering the line.

Other objects and advantages of the method and means employed will appear more fully when taken in connection with the accompanying drawings wherein.

For the purpose of illustrating the invention, I have shown one form thereof which is at present preferred by me, but it is to be understood that the various instrumentalities composing the invention can be variously arranged and organized and that the invention is not limited to the precise arrangement and organization of the instrumentalities as herein shown and described.

The invention resides in the combination and arrangement of parts and in the details of construction hereinafter set forth.

Referring now to the drawings wherein similar characters of reference indicate corresponding parts in the several views of the preferred form of the invention, the numeral 21 designates a casing or tank having an oil level gage 22 and a cover 23 to which latter is attached the mechanism forming the features of the present invention.

The cover 23 is removably fastened to the casing or tank 21 in any suitable manner, as by the screws 24. To the top surface of the cover 23, which has a hinged lid 23', a bearing bracket 25 is fastened or integrally formed therewith. Rotatably mounted in a bushing 26 arranged in the bearing bracket 25 is a shaft 27 on the outer end of which a sheave 28 is secured for the application of power. On the inner end of the shaft 27, a pinion 29 is keyed, the said pinion meshing with a comparatively large gear 30 mounted on a crank shaft 31 (Fig. 5) which actuates the lubricant pump, as hereinafter set forth.

The shaft 31 is rotatably mounted at one end in a bushing 31' arranged in a wall of the pump casing described below, and at its other end by a bracket 32 secured by screws 33 and nuts 34 to an apertured lug 35 integrally formed with the cover 23. A second bracket 36, also secured by a screw 36' and nut 37 to an apertured lug 38 integral with the cover 23, is arranged opposite the bracket 32 and serves, in conjunction therewith, to support an intermediate gear shaft 39 hereinafter described.

Figure 4:
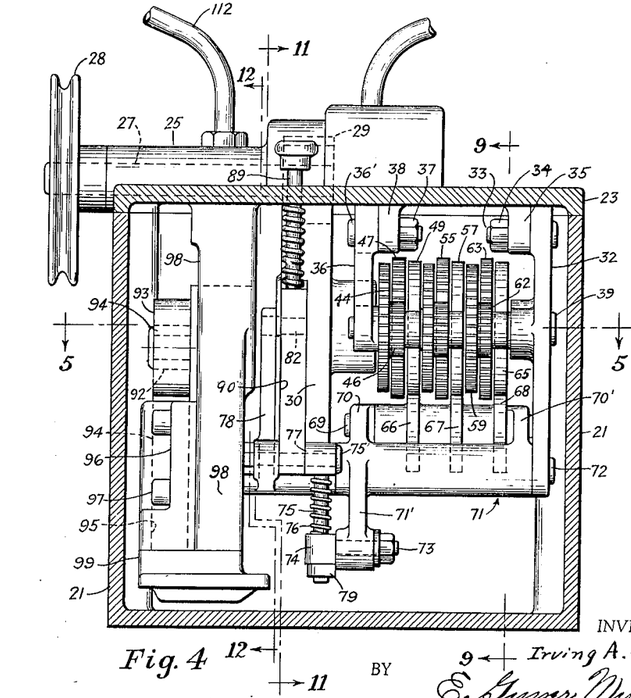
Fig. 4 is a vertical sectional view, taken on a plane parallel to the front of the device, as seen in Figure 1.

The shaft 31 has rotatably arranged thereon three pinions each having integrally formed therewith a sleeve. Two of these sleeves are individually provided with a gear and a cam both of which latter are keyed or otherwise suitably fastened to their adjacent sleeve. A fourth sleeve, also rotatably mounted on the shaft 31, has keyed thereon a gear and a cam. Coactingly associated with the pinions and gears on the said sleeves is a corresponding plurality of gears and pinions fastened to a plurality of sleeves rotatably mounted on the intermediate gear shaft 39 mentioned above (Figs. 4 and 5). The coacting gears and pinions referred to above constitute a gear reduction system which is effective to actuate, through the intermediary of the cams alluded to above and other coacting elements hereinafter set forth, a clutch, the latter in turn, causing the rotation of the crank shaft 31 that is connected to the reciprocating plunger pump for the ejection of lubricant in accordance with the objects and design of the invention. These parts and functions will now be described.

Keyed to the driven gear 30 and rotatable on the shaft 31 is a sleeve or bushing 42, referred to above, and having integrally formed therewith a timing gear pinion 43 which meshes with and drives a gear 44, fast to a sleeve 45 freely rotatable on the intermediate gear shaft 39 and having a pinion 46 formed thereon. The pinion 46 is engaged by a gear 47 fast to a second sleeve 48 loose on the shaft 31 and also having keyed thereto a cam 49 and an integral pinion 51. The pinion 51 meshes with a gear 52 secured to a sleeve 53 rotatable on the shaft 39 and having an integral pinion 54. The last mentioned pinion 54 engages a gear 55 secured to a sleeve 56 turnable on the shaft 31 and having in addition a cam 57 keyed thereto and an integrally-formed pinion 58.

The pinion 58 is engaged by a gear 59 fast to a sleeve 61 rotatable on the shaft 39 and having an integral pinion 62, the latter meshing with a gear 63 fast to a sleeve 64 rotatable on the crank shaft 31 and provided with a cam 65 also fastened to the sleeve 64. The cams 49, 57 and 65 alluded to above are adapted to be engaged by timing cam rolls 66, 67 and 68 respectively (see Fig. 4), which are rotatably mounted on a common stud shaft 69 secured to and between the arms 70 and 70' of a cam roll lever 71, pivoted on a shaft 72, supported at one end in the bracket 32 and at its other end in an adjacent portion of the pump casing or casting referred to hereinafter. The cam roll lever 71 has a downwardly directed third arm 71' which has suitably secured thereto a stud 73 provided with a poppet 74. A spring rod 75 which passes through the poppet 74 is encircled by a spring 76 the ends of which are confined between the said poppet 74 and a shoulder 77 on the rod 75. The spring rod 75 is pivotally connected by a pin or stud 75' to a clutch trip lever 78. Movement of the spring rod 75 in an upward direction relatively to the poppet 74 is limited by a collar 79.

Figure 14:
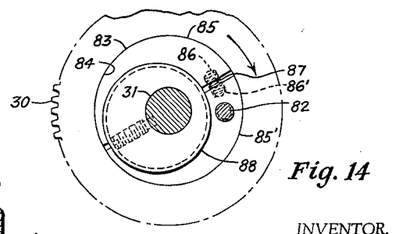
Fig. 14 is a sectional view, partly in elevation, taken on the line and as viewed in the direction of the arrows 14—14 of Fig. 5.

The spring-biased trip lever 78 has one end notched as at 81 to accommodate a clutch trip pin 82, fastened to a portion of a clutch eccentric 83 (Figs. 5 and 14), which is received in an annular recess 84 formed in the driving gear 30. The clutch eccentric 83, as best shown in Fig. 14, comprises two symmetrical half portions 85 and 85', each provided with a pocket 86, 86' adapted in conjunction to accommodate a compression spring 87 therebetween, the said spring normally tending to spread apart the half portions 85 and 85' into operative binding relation with the annular recess 84 of the gear 30 and also into frictional engagement with a clutch collar 88 keyed to the shaft 31. When the clutch trip lever 78 which normally maintains the two half portions 85, 85' of the clutch eccentric 83 out of operative engagement with the recess 84 and the clutch collar 88 is disengaged from the clutch pin 82, as hereinafter described, a driving relation between the rotating gear 30 and the pump-operating shaft 31 is established.

Figure 11:
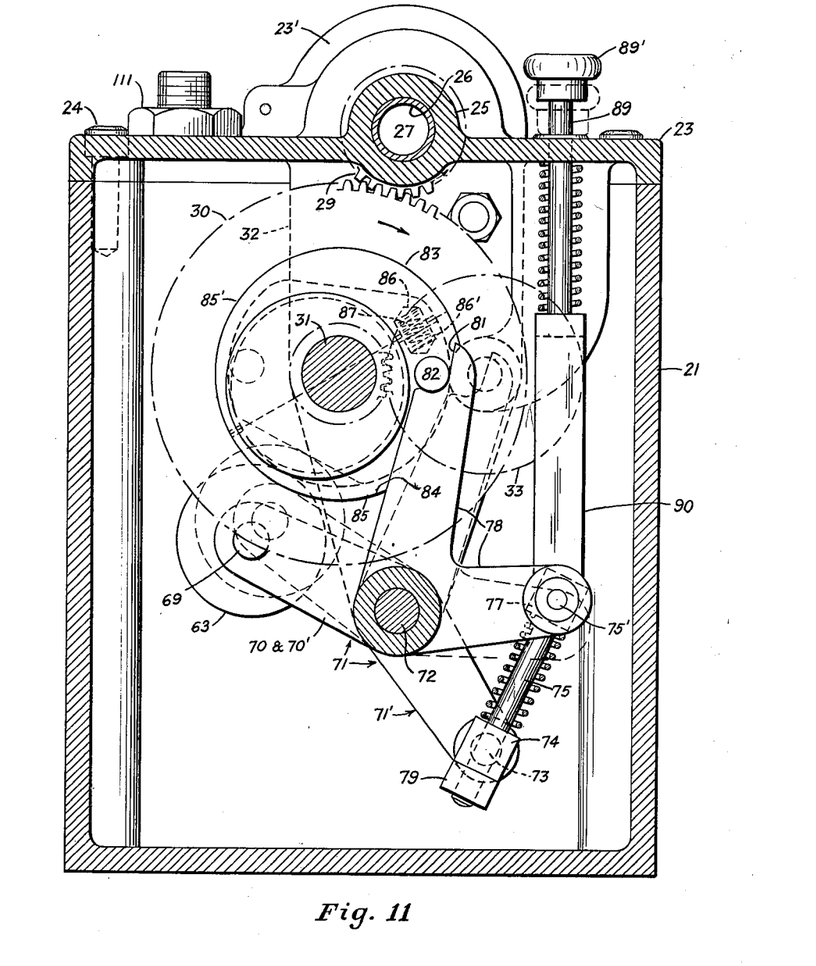
Fig. 11 is a sectional view, taken on the line and as viewed in the direction of the arrows 11—11 of Fig. 4.

A manually operable spring rod 89, protruded through the cover 23, has an enlarged extended square portion 90 mounted rotatably on the pin 75' secured to the clutch trip lever 78, whereby the clutch lever 78 may be actuated independently of the automatic operation of the crank shaft 31. This is accomplished by pressing down on the knob 89' of the spring rod 89 thereby pressing the said rod and the adjacent arm of the attached clutch trip lever 78 against the urge of the spring 76 and with the urge of the spring on the manually operable rod 89. This results in a partial rotation of the clutch trip lever 78 in a clockwise direction (as viewed in Fig. 11) and the removal of the notch 81 thereon from the trip pin 82. The spring-biased half portions of the clutch eccentric 83 will now be urged into operative engagement with the clutch collar 88 and the surface of the annular recess 84 in the driving gear 30, torque then being communicated to the pump-operating shaft 31 which latter is provided with a crank pin 91 having a block 92 rotatably mounted thereon (Fig. 5).

The block 92 on the crank pin 91 is slidably received in an elongated opening 93' formed in the head 93 of a piston 94, which is adapted to reciprocate in the bore 95 of a pump casting 96, attached by screws 97 to a support of pump casing 96 fastened to or integrally formed with the cover 23. As long as the spring rod 89 is depressed by the hand of the operator, it will be seen that the shaft 31 will continue to rotate and the pump piston 94 to reciprocate, thereby ejecting lubricant to the amount desired. If the spring rod 89 is only momentarily depressed, there will be a single rotation of the shaft 31 and consequently only one reciprocation of the pump, this being due to the return of the clutch trip lever 78 to its normal spring-pressed position wherein the notch 81 receives the trip pin 82 in its rotation, thereby compressing the spring 87 and causing the two half portions of the clutch eccentric 83 to be disengaged from the clutch collar 88 and the gear 30. This automatic operation of the pump is described hereinafter.

Figure 12:
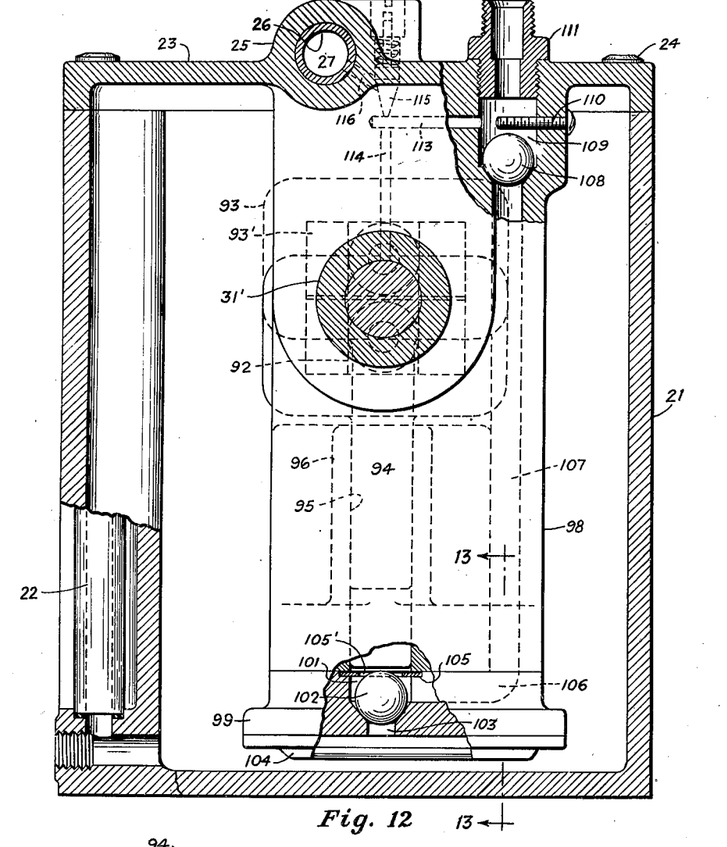
Fig. 12 is a sectional view, taken on the line and as viewed in the direction of the arrows 12—12 of Fig. 4, with parts broken away for the purpose of clearer illustration, the extreme top position of the pump piston being shown in dotted lines, and the bottom position thereof partly in full lines and partly in dotted lines.
Figure 13:
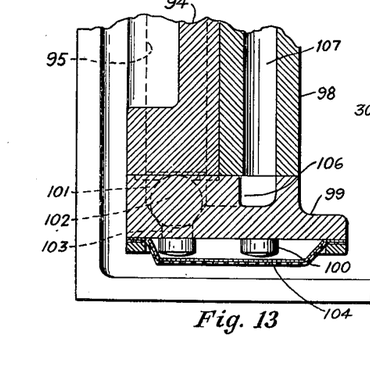
Fig. 13 is a fragmentary sectional view, taken on the line 13—13 of Fig. 12.

By inspection of Figs. 12 and 13, it will be seen that the base 99 of the pump cylinder casting 96 is secured to the latter in any suitable manner, as by the screws 100, and is formed with a pocket 101 communicating directly with the bore 95 and accommodating a ball 102 normally closing a duct 103 through which lubricant is drawn from the supply in the tank, through the filter 104 suitably secured to the base 99. The ball 102 is confined against undue upward movement by a washer 105 having a somewhat elongated slot 105' which receives a portion of the said ball but permits lubricant to flow on either side of same, when the piston is executing its upward or suction stroke.

Figure 5:
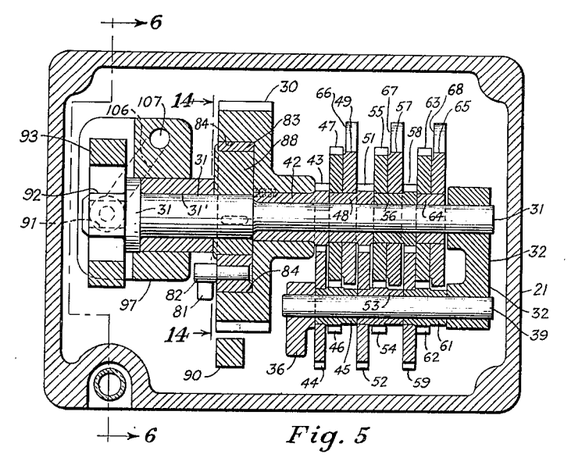
Fig. 5 is a horizontal sectional view, taken on the line, and as seen in the direction of the arrows 5—5 of Fig. 4.
Figure 6:
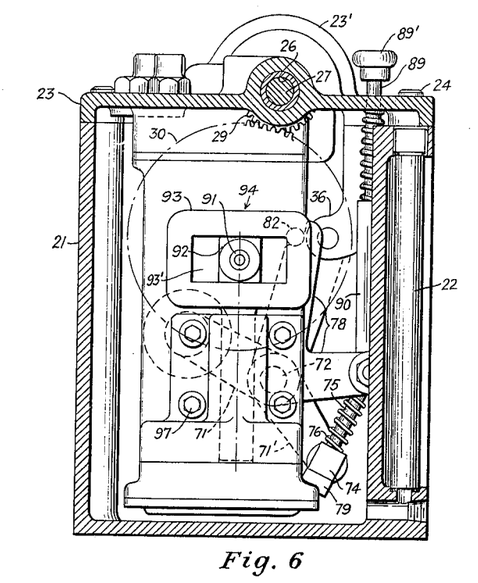
Fig. 6 is a vertical sectional view, taken on the line and as viewed in the direction of the arrows 6—6 of Fig. 5.

A channel 106, best shown in Figs. 5 and 12, communicates with pocket 101 and bore 95, and also opens into a vertically directed channel 107 (Figs. 12 and 13). The channel 107 is normally closed at the top by a ball 108 seated in an enlarged opening or pocket 109 of the said channel 107, and restrained in its upward movement by a stop pin 110 protruding through the wall of the casing 98. To a coupling member 111 threadedly secured in the pocket 109, a lubricant feed pipe 112, which supplies the lubricant to the mechanism to be oiled, is attached. By further inspection of Fig. 12, it will be noticed that a duct 113 communicates with the pocket 109 and, by a coacting duct 114, with the crank shaft 31 through the bushing 31'. The same duct 113, through the intermediary of an adjustable pressure valve 115 and a short duct 116, is adapted to supply a graduated amount of lubricant to the driven shaft 27 on which the driving pinion 29 is keyed.

Figures 1, 2:
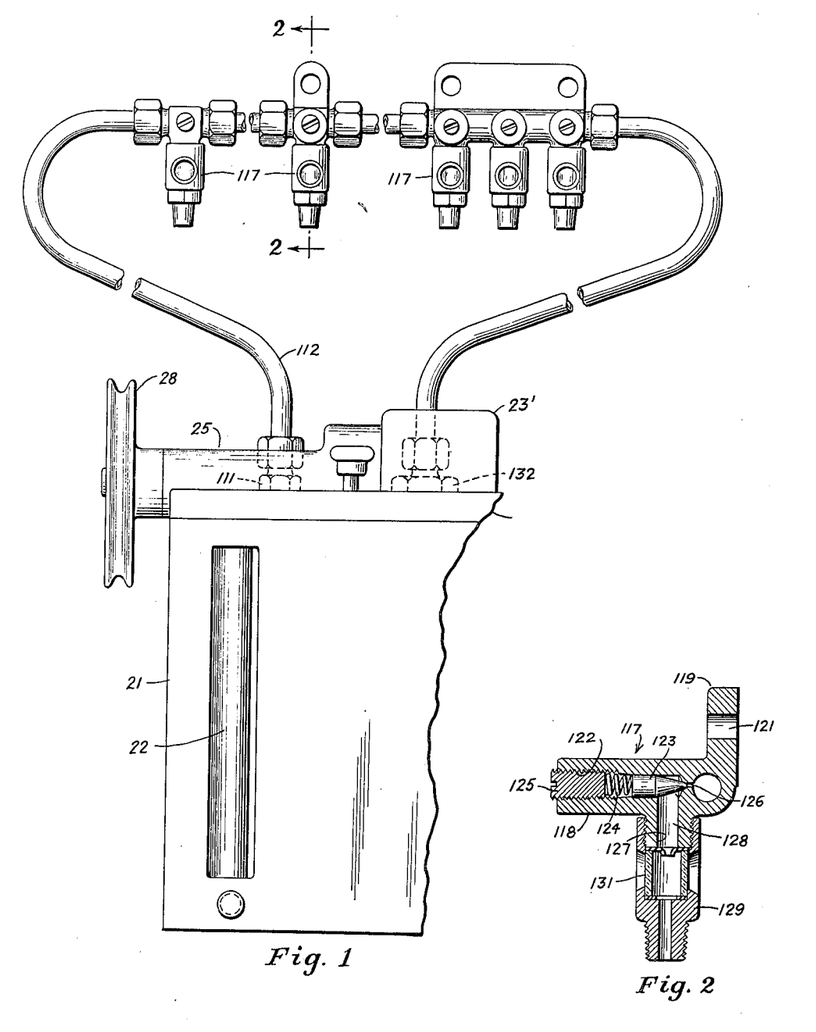
Figure 1 is a fragmentary elevational view of an embodiment of the invention, showing the exterior of a casing or tank wherein the mechanism constituting the features of this invention is operatively inclosed, certain of the feed pipes and associated feed valves being shown in operative relation.
Fig. 2 is a longitudinal sectional view, taken on the line 2—2 of Figure 1, showing one of the adjustable feed valves employed.
Figure 3:
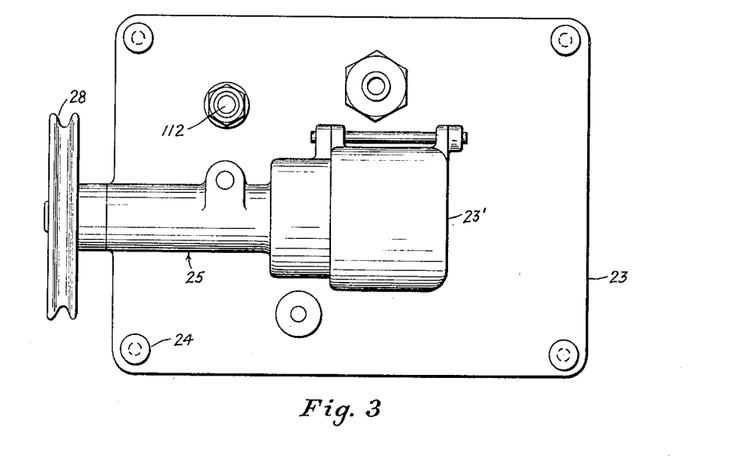
Fig. 3 is a plan view of the casing or tank, with feed pipes and valves removed for the purpose of clearer illustration.

The feed pipe 112, as best shown in Figure 1, is adapted to force lubricant intermittently under pressure through a series of adjustable pressure type valves 117, one of which is shown, by way of example, in Fig. 2. Each lubricant pressure valve comprises a valve body 118, which may have a supporting arm or bracket member 119, apertured as at 121 to accommodate suitable means (not shown) to support the said valve and adjacent portions of the feed pipe to the machine or its support. In a bore 122 of the valve body, a valve stem or plunger 123 is resiliently biased by a spring 124 confined between a screw plug 125 in the said bore and the adjacent end of the valve stem. The tapered end of the valve stem 123 is normally projected by the spring 124 into a narrow duct 126 which forms the medium of communication between the feed pipe 112 and a passageway or duct 127 formed in a downwardly directed portion 128 of the valve body 118. The downwardly directed portion 128 has threadedly secured thereto a casing 129 provided with a window or sight feed element 131, and is also formed with a threaded nipple for suitable attachment to conduits or other members leading to various parts of the mechanism to be lubricated.

Figure 7:
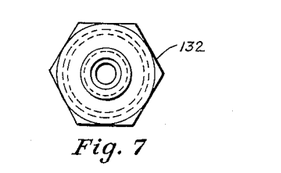
Fig. 7 is a plan view of the main pressure-regulating valve employed in the arrangement.
Figure 8:
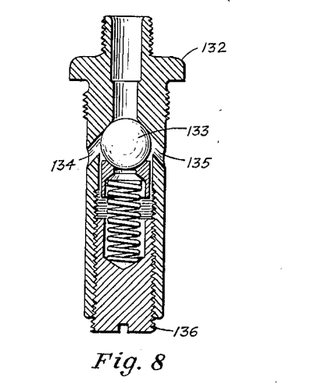
Fig. 8 is a longitudinal or vertical sectional view of the valve shown in Fig. 7.
Figure 9:
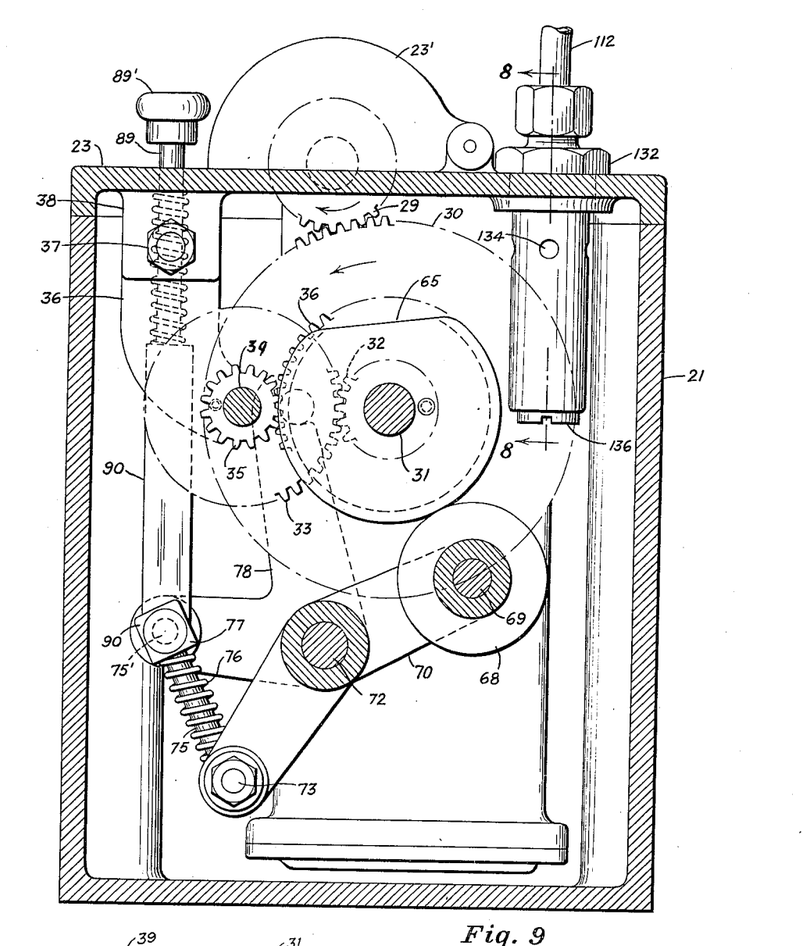
Fig. 9 is a sectional view, taken on the line and as viewed in the direction of the arrows 9—9 of Fig. 4.
Figure 10:
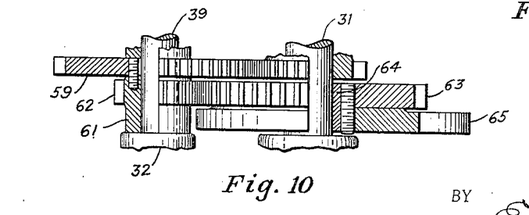
Fig. 10 is an enlarged, fragmentary detail view of certain portions of the mechanism depicted in Figure 5, showing the pump-operating crank shaft, intermediate cam shaft, certain of the coacting gears and other coacting elements.

All lubricant not actually conveyed to the parts to be lubricated and flowing through the feed pipe 112 is returned to the tank 21 after passing through a pressure regulating valve indicated generally at 132 and shown in Figs. 7 and 8. The pressure-regulating valve 132 includes the customary ball thrust member 133 normally closing ducts 134, 135 and adapted, by regulation of the adjusting screw or plug 136, to control the general pressure predetermined, at which lubricant is to be supplied to the individual valves 117, which latter, by adjustment of their screw plugs 125 may be individually adjusted to dispense a graduated, variable amount of lubricant in the quantity desired.

The function and mode of operation of the device, which has been in large measure indicated above, may be summarized as follows:

Assuming the tank 21 to have a suitable supply of lubricant, as ascertained by the oil level gage 22, and the device including the feed pipes 112 and individual valves 117 to be operatively connected to a mechanism to be lubricated, and further assuming the main pressure-regulating valve 132 and the individual valves to have been preadjusted to supply the lubricant at the rate and under the pressure desired, the sheave 28 to be suitably connected to any source of power, and the shaft 27 to be rotating,—the pinion 29 and the gear 30 meshing therewith will constantly rotate, the shaft 31 meanwhile remaining stationary since the clutch trip lever 78 by its engagement with the clutch trip pin 82 maintains the two half portions 85, 85' of the clutch eccentric out of operative engagement with the clutch collar 88 and the annular clutch recess 84 of said rotating gear 30. However, the pinion 43 integral with the pinion sleeve 42 which is keyed to the rotating gear 30, but free on the shaft 31, will communicate rotational movement to the entire system of coacting gears and pinions which freely rotate on the pump shaft 31 and the intermediate gear shaft 39, described above, and which constitute a gear reduction unit. This gear reduction unit or system, which may operate after a predetermined number of seconds or minutes, in accordance with a preselection of pinions and coacting gears with the predetermined number of teeth desired, is adapted, through the intermediary of the three cams 49, 57 and 65 when in line, to cause a timed swing to the cam rolls 66, 67 and 68 supported on the cam roll lever 71 which rocks on the shaft 72, and thence, via the clutch trip lever 78 and coacting trip pin 82, to trip the clutch in order to operatively connect the constantly rotating gear 30 to the pump-operating shaft 31. In the form herein illustrated, the pinions and gears, fastened to the sleeves which freely turn on crank shaft 31, have 16 and 36 teeth respectively. The pinions and gears fastened to the sleeves which freely turn on the intermediate gear shaft 39, have 12 and 32 teeth respectively. It will therefore be obvious, by inspection of Fig. 5, that the first cam 49, which is fixed to the gear 47, will rotate at the speed of the latter; i. e., one-sixth of the speed of the gear 30 and the pinion rotating therewith; the second cam 57, which is fixed to the gear 55, will rotate at one-sixth of the speed of the cam 49, or at one thirty-sixth of the speed of the gear 30; the third cam 65 which is fast to the gear 63, will rotate at one-sixth the speed of the second cam or at $\frac{1}{216}$ of the speed of the gear 30.

Since the cam rolls 66, 67 and 68 (on the common shaft 69) which coact with the cams 49, 57 and 65, are maintained thereagainst by the urge of the spring 76, on the cam roll lever 71 to which they are attached, and also by the urge of the spring on rod 89, it will be further evident that the said cam roll lever cannot move in a clockwise direction (as viewed in Fig. 11) to cause the clutch trip lever to trip the clutch, until all the depressed portions on the said cams are in line, which will occur, as explained above, once in every 216 rotations of the gear 30, assuming the depressed portions of the said cams to have been preliminarily aligned before the operation of the device. By the elimination or addition of one or more of the cams and coacting cam rolls, it will be seen that a wide latitude in timing the dispensing of the lubricant will be obtained. As illustrated, the device operates once each 216 revolutions of the driving gear which latter may be timed to rotate about 60 revolutions per minute. This time may be varied to suit individual requirements and can be easily changed in any pump of this description after it is built, by providing, for example, more flats on the cams in order to operate the pump more frequently during a given space of time.

If desired, the mechanism to be oiled may be given a preliminary supply of lubricant in excess of that dispensed in accordance with the automatic timing instrumentalities, or whenever required, by holding down the manual operating rod 89, mentioned above, for a few seconds, during which time, there will be an ejection of lubricant from the pump at each rotation of the gear 30 and the pump shaft 31, as explained above. Since substantially the entire operating mechanism is attached to the cover 23, it will be observed that whenever desired, for the purpose of inspection, adjustment or repair, by merely detaching the screws 24 and without detaching the feed pipes 112 and associated valves, the tank 22 can be dropped, and the operating parts of the device surveyed. The pump and its operating parts, it will be further observed, as described and illustrated, is self-oiling; and the oiling system itself embodied in the invention may be cursorily described as consisting essentially of a tank containing a pump operated by a timed clutch and adapted to oil each bearing by one stroke of the said pump.

It will be understood that the invention may be embodied in other specific forms without departing from the spirit or essential attributes thereof, and it is therefore desired that the present embodiment be considered in all respects as illustrative and not restrictive, and it will be further understood that each and every novel feature and combination present in or possessed by the mechanism herein disclosed forms a part of the invention included in this application.

Having thus described my invention, what I claim as new and desire to secure by Letters Patent is:

1. In a lubricating system of the character described, the combination of a lubricant tank, a cover removably secured to the tank, an assembly secured to the cover, said assembly including a lubricant pump, a gear member rotatable within the tank, a shaft passing longitudinally through the axis of said gear and connected to a clutch, said clutch being positioned within the gear member, timing mechanism connected to the gear member to actuate the clutch to couple the shaft and gear member together; and means within the tank to variably control the pressure of the lubricant dispensed by the pump.

2. In a lubricant system of the character described, the combination of a reciprocating pump adapted to dispense oil under pressure, a crank shaft connected to the pump, said crank shaft being normally stationary, a clutch assembly mounted on the crank shaft, a sleeve rotatable on the shaft, a gear fast to the sleeve and having a recess accommodating said assembly, a reciprocating lubricant pump connected to the crank shaft, and a timing mechanism comprising a train of coacting gears and cams and driven by the gear, said timing mechanism periodically actuating the clutch assembly to effect the rotation of the normally stationary shaft and the reciprocation of the pump.

3. In a lubricating system, the combination of a constantly driven rotating member including clutch means, a shaft, a timing mechanism consisting of a series of gear reduction units, each unit carrying a cam, the cams forming a series running on said shaft, the first of said cams running slower than the said rotating member and each one of the other cams turning slower than the preceding cam by an even ratio, a series of cam rolls one for each cam, said cam rolls running on a spring-biased shaft, said shaft being intermittently moved, thereby causing all of the cam rolls to drop into aligned depressed areas of the cams at predetermined intervals and consequently causing the clutch to turn the shaft one revolution to operate a lubricant pump.

4. In a lubricating system, the combination of a lubricant reservoir, a pump for lubricant arranged within the reservoir, a rotating driven member for operating the pump, a clutch arranged within and connectible to the rotating member, timing mechanism connected to the rotating member and including a series of cams running at progressively slower speeds, said cams being so arranged that their depressed portions may become aligned at each revolution of the slowest cam, thereby causing the clutch to couple the rotating member to the pump.

5. In a lubricating system, the combination of a pump, a shaft to reciprocate the pump, a rotating member, a clutch within the rotating member for operating the shaft, said clutch having an eccentric arranged to lock the rotating member to the shaft at predetermined intervals, a pin in the eccentric and a timing mechanism for blocking the pin thereby preventing the eccentric from turning until desired.

6. In a lubricating system comprising in combination a circuit conduit, a plurality of feeders supplied thereby, means to intermittently supply oil under pressure to the conduit comprising a tank for containing oil, a cover for said tank, a continuously running driving shaft located on the cover above the oil in the tank, a pump suspended from the cover and operated from a crank shaft located within the tank, a wheel free on said shaft and driven from the driving shaft, a friction clutch arranged within the wheel and having an eccentric ring provided with a projecting pin, an arm for holding the pin to prevent the clutch from turning the crank shaft, a timing mechanism consisting of a series of gear reducing units, each unit carrying a cam, the cams forming a series running on said crank shaft, the first cam turning slower than said wheel and each of the other cams running slower than the preceding cam by an even ratio, a series of cam rolls one for each cam, said cam rolls running on a shaft, said shaft being movable to allow all of the cam rolls to swing into depressed portions on the cams when the cams become aligned, said movable shaft being connected to the arm holding the pin and adapted to swing it out of contact with the pin to cause the clutch to operate the crank shaft and thus operate the pump one stroke.

7. In a lubricating system, the combination of a pump, a crank shaft for operating said pump and extending through a constantly driven rotating member, a clutch arranged on the shaft and having an eccentric ring, means projecting from the ring, an arm to hold the said means and thereby prevent the clutch from turning the crank shaft, and a timing mechanism adapted to disconnect the arm from the means to permit the clutch to turn the crank shaft and then operate the pump one stroke.

8. A combination as specified in claim 7 wherein manually operable means are provided to disconnect the arm from the first mentioned means in order to permit the clutch to operate the pump a variable number of strokes.

9. In a lubricating system, the combination of a pump, a shaft to reciprocate the pump, a rotating member, a clutch within the rotating member for operating the shaft, said clutch having an eccentric arranged to lock the rotating member to the shaft at predetermined intervals, means mechanically connected to the eccentric, and a timing mechanism coactable with and adapted to block said means at a predetermined time in order to prevent said eccentric from turning until desired.

IRVING A. HUNTING.